Jan. 12, 1960
L. J. MINNICK ET AL
2,920,922
METHOD OF HANDLING LIME
Filed Jan. 2, 1957
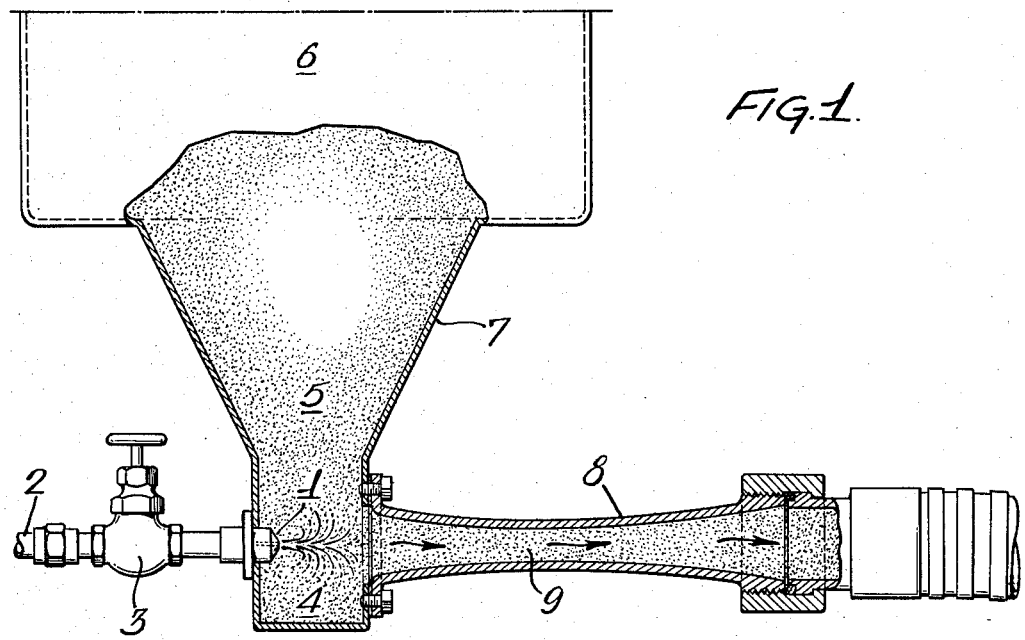
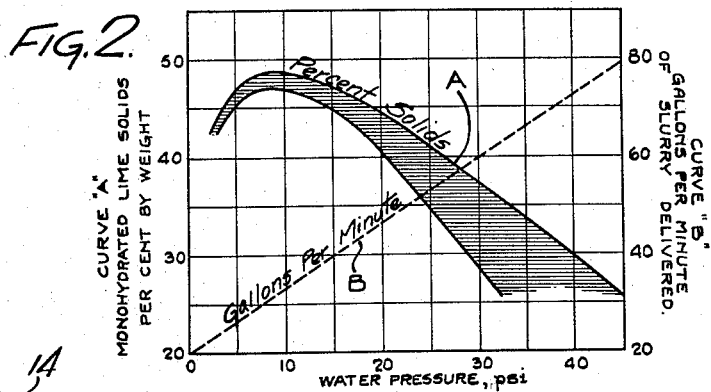
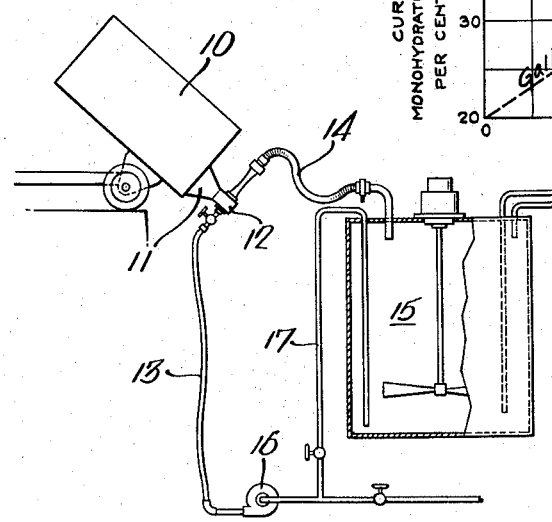
Inventors:
Leonard John Minnick
Clifton A. Danforth
by Howson & Howson
Attys.

United States Patent Office 2,920,922
Patented Jan. 12, 1960

2,920,922
METHOD OF HANDLING LIME

Leonard John Minnick, Cheltenham, and Clifton A. Danforth, Philadelphia, Pa., assignors to G. & W. H. Corson, Incorporated, Plymouth Meeting, Pa., a corporation of Delaware Application January 2, 1957, Serial No. 632,061

9 Claims. (Cl. 302—14)

The present invention relates to a novel method for handling dry, finely-divided lime and transforming it into a concentrated aqueous slurry thereof; and, more particularly, the present invention relates to a novel method for forming a lime slurry from dry, finely-divided lime.

There are many instances where it is desirable to prepare a pumpable slurry of lime containing a high solids concentration. Such slurries are particularly useful in chemical treating processes, for example, in the neutralization of waste acid liquors, where a fluid slurry of high definite lime concentration is more easily handled by the user than is the dry material. Such slurries are more convenient to use than quick limes, the latter requiring special slaking equipment and handling as dilute slurries.

The mere mixing, by the user, of the dry, finely-divided lime with water presents certain difficulties and is not always convenient. Where the user of the lime can utilize the lime in the form of an aqueous slurry, the storage of the dry, finely-divided lime in bulk form or in bags and the occasional mixing, by him, of the desired increments of the lime with water for utilization is often a time-consuming procedure which places upon him the responsibility of carefully mixing the lime with water each time it is necessary to prepare a new batch. As far as the user is concerned, therefore, the delivery to him of an aqueous slurry of the lime of known concentration which can be stored as such and utilized as desired would be a much more desirable mode of operation. However, the transportation of such a slurry is also impractical due to the quantity of water involved as well as to the nature of the slurry itself. Accordingly, a means for handling lime including transporting it in dry, finely-divided form and then transforming the dry, finely-divided lime, upon its delivery, at the site of the user directly into a pumpable slurry, especially a high solids slurry, for storage and subsequent utilization would be highly desirable. This is particularly so where the dry, finely-divided lime can be converted to the slurry on the vehicle used to deliver the dry product to the user.

It is the principal object of the present invention to provide a novel method for transforming dry, finely-divided, lime directly into a pumpable, aqueous slurry thereof without the disadvantages attending simple batch mixing of bulk lime with water.

Another object of the present invention is to provide a method for transforming dry, finely-divided lime into a pumpable, high solids, aqueous slurry using a flowing aqueous stream.

Still another object of the present invention is to provide a novel method for transferring lime, from a dry, finely-divided bulk deposit, to a storage and utilization zone in the form of a pumpable, high-solids aqueous slurry.

A further object of the present invention is to provide a novel method for transporting and delivering to a site of utilization finely-divided monohydrated lime in the form of a pumpable, aqueous slurry, especially a high solids slurry.

Other objects, including a novel method for handling finely-divided lime, will become apparent from a consideration of the following specification and the claims.

The method of the present invention for transforming dry, finely-divided monohydrated lime into a pumpable, aqueous slurry comprises continuously flowing the dry, finely-divided lime into a confined, continuous, turbulently flowing, aqueous stream, the relative rates of flow of said dry, finely-divided lime and said aqueous stream into each other being such that there are between about 30 and about 50 parts, by weight, of hydrated lime per 100 parts, by weight, of slurry leaving the site of contact, and continuously withdrawing from said site of contact a stream constituting the resulting slurry.

The present invention will be more readily understood from a consideration of the drawings in which:

Fig. 1 represents a side elevational view, partly in section, of typical means for transforming the dry, finely-divided lime into a slurry;

Fig. 2 sets forth curves relating concentration of lime solids, using monohydrated lime in a typical system, in the slurry to pressure of the aqueous stream and relating rate of slurry delivery to pressure of the aqueous stream, and Fig. 3 is a schematic diagram illustrating the transferrence of finely-divided lime, from a dry bulk lime deposit, such as the transporting vehicle, to a storage zone at the site of utilization as a slurry.

The present invention makes it possible to transport dry, finely-divided lime, in bulk, in a vehicle, such as a truck, box car, or the like, from the producer to the consumer and to transform the dry bulk lime directly to the desired pumpable slurry for storage at the site of utilization. This system renders unnecessary the handling and storage of the dry lime in bulk form or in bags by the consumer and the consequent handling, proportioning, mixing and utilization of the lime, by the consumer, in dry form with its attendant difficulties and disadvantages. The present method simplifies the delivery procedure of the transporter of the lime, all that is required being the atachment of suitable liquid-carrying lines, discussed more in detail hereinafter, to the dry lime receptacle and the opening of the appropriate valve or valves. Accordingly, one aspect of the invention involves a method of handling lime which comprises transporting the lime to the consumer, in dry, finely-divided form, then, at the site of utilization converting the dry, finely-divided lime to a pumpable slurry by continuousy flowing the dry, finely-divided lime into a confined, continuous, turbulently-flowing, aqueous stream as recited above and flowing the resulting lime slurry to storage.

The "lime" referred to herein, in accordance with the broader aspect of the invention, includes high calcium limes, high magnesium limes and dolomitic limes. The lime may be, either quick lime or hydrated to any extent, such as the monohydrated and dihydrated. Monohydrated lime (that is, lime containing both calcium and magnesium in which only the calcium is hydrated) has been found to form slurries of unexpectedly high solids content—substantially higher than the other forms of lime—at relatively low water pressures, and hence monohydrated lime represents the preferred lime for use in accordance with the present invention.

The normal use of eductors for transforming dry finely-divided material into an aqueous slurry requires the use of water under high pressures which may be obtained through the use of pressure pumps or booster pumps. It has been found that with monohydrated lime low liquid pressures can be used and actually produce higher concentrations of solids in the resulting slurry than do the higher pressures. This is illustrated in Figure 2 which is a typical curve showing the relationship between the pressure of the aqueous stream employed and the solids content of the resulting slurry. It will be noted that the highest solids concentration occurs with a liquid pressure between about 5 and about 15 pounds per square inch. Below 5 pounds per square inch the solids content drops off sharply. The maximum municipality water main pressure is in the neighborhood of about 30 pounds per square inch. Hence, within the range of about 5 pounds to about 30 pounds per square inch, which would be available either through the use of water directly from a water main or through the use of water from a storage tank with or without the aid of a low pressure pump, a lime slurry having a solids concentration above about 30%, by weight, based on the weight of the slurry can be formed using monohydrated lime. There is no need to employ high pressure pumps or booster pumps, and, in fact, as will be seen from Figure 2, the use of pressures above about 30 pounds per square inch leads to markedly reduced lime concentrations. Using plain water as the aqueous stream feed concentrations of monohydrated lime as high as about 48–49%, by weight, can be obtained using plain water at pressures in the neighborhood of 10 pounds per square inch. The same low pressures can be used with other forms of lime, although in this case the obtainable concentration of lime in the resulting slurry is materially less.

It has also been found that, with the employement of pressures within the stated range below or above the optimum, a portion of the resulting slurry can be mixed with further water and the resulting dilute slurry recycled as the aqueous stream to the eductor to provide a solids content in the resulting slurry above that which could be obtained through the use of plain water as feed at the pressure employed. For example, the maximum solids concentration of monohydrated lime to provide a pumpable slurry is in the neighborhood of about 50%, by weight. Hence, by appropriate control of the lime solids in the aqueous feed to the eductor in the recycling embodiment it is possible to obtain a slurry having a solids content in the neighborhood of about 50% employing pressures within the above-stated range, below or above the stated optimum. This means, of course, that where the available water supply in the water main has a pressure for example between about 20 and about 30 pounds per square inch it is still possible to produce a slurry having a solids content in the neighborhood of about 50% through appropriate recycling of a portion of the slurry.

As stated, the maximum concentration of lime in the slurry that can be formed to provide a pumpable slurry is about 50%, by weight, and this is achieved with monohydrated lime. This means that the rate of flow of liquid carrier, that is water or dilute lime slurry, fed to the eductor is controlled at a rate, relative to the flow of the dry, finely-divided lime thereinto, such that the total lime solids represents not more than about 50%, by weight, of the lime-water mixture. Using plain water alone as the liquid carrier at pressures within the above-stated range, the concentration of lime solids in the resulting slurry obtained at pressures as high as even about 30 pounds per square inch and using monohydrated lime is generally no lower than about 30%, by weight. Hence, the rate of flow of the liquid carrier relative to the rate of flow of the dry, finely-divided monohydrated lime thereinto will be such as to provide a total of at least about 30%, by weight, lime solids in the lime-water mixture. With other forms of lime, suitable adjustment in the relative proportions of lime and water can be made to provide other concentration ranges, and in some cases the lime concentration may be as low as 10%.

Figure 1 illustrates one means for transforming the dry, finely-divided lime into the slurry. Aqueous stream 1 is fed through conduit 2, the rate of flow of the water being controlled as by valve 3. Aqueous stream 1 is injected into mixing chamber 4. Dry, finely-divided lime 5, held in hopper 6, is permitted to flow, by means of gravity, through chute 7 into mixing chamber 4 and hence into the turbulent aqueous stream. Rapid and intimate mixing of the finely-divided lime and aqueous stream takes place in chamber 4 and the resulting slurry, 7, is continuously removed through conduit 8. As stated, a portion of the slurry may be recycled and mixed with further water, to serve as the aqueous stream feed; and, hence, the aqueous stream 1 referred to above may be either water itself or dilute lime slurry. Other forms of eductor may be used, such as the peripheral jet eductor in which several jets or nozzles converge in the mixing chamber 4. The operation of such eductors is, however, based on a pressure drop caused by a venturi structure (as illustrated in Figure 1 in connection with conduit 8) which helps to draw the dry, finely-divided lime into the flowing stream.

Figure 3 illustrates schematically a complete lime-handling system, including means for recirculating a portion of the slurry, if desired. 10 represents a hopper for holding the dry, finely-divided lime in bulk. As shown in this figure, hopper 10 may actually be positioned on a dump truck which serves to transport the bulk, dry, lime from the manufacturer, producer or supplier to the site of storage and utilization. 11 represents the enclosed chute through which the dry lime flows into eductor 12. Water is flowed through conduit 13, and may be flowed directly from the water source to eductor 12. The slurry ejected from eductor 12 is conducted as through conduit 14 to slurry-holding tank 15. In the event it is desired to recirculate a portion of the slurry, such slurry may be removed from holding tank 15 through conduit 17 connected to conduit 18. Where the normal water pressure is not at the desired level within the above-stated range or where pumping is required to remove slurry from holding tank 15, pump 16 may be employed.

Figure 2 illustrates graphically typical data obtained using an eductor of the type illustrated in Figure 1 and treating monohydrated lime with plain water as the feed. The rate of lime slurry delivered, in gallons per minute, is directly proportional to the water pressure in the feed line. However, the concentration of monohydrated lime solids in the resulting slurry is at a maximum in the pressure range of 5 to 30 p.s.i. When high concentration is not the principal requirement, high slurry delivery rate may dictate operation in the upper end of the pressure range even where concentration is not at the maximum. Slurry delivery rate can be sacrificed, however, for maximum concentrations at the lower end of the range when high concentration is desired.

Considerable modification is possible in the selection of techniques followed in adapting the present process to particular applications without departing from the scope of the invention.

We claim:

1. The method of transforming dry, finely-divided hydrated lime into a pumpable aqueous slurry having a high solids content which comprises: continuously flowing by gravity the dry, finely-divided lime into a mixing zone; continuously injecting aqueous liquid, at a pressure between about 4 and about 30 pounds per square inch, into said mixing zone with the resultant mixing of said lime and said aqueous liquid as a slurry in said mixing zone, the rates of flow of said lime and said aqueous liquid being such that there are between about 30 and about 50 parts, by weight, of lime per 100 parts, by weight, of slurry; and continuously withdrawing the slurry from said mixing zone through a zone of reduced pressure.

2. The method of claim 1 wherein said lime is monohydrated lime.

3. The method of claim 1 wherein said aqueous liquid is water.

4. The method of claim 3 wherein said lime is monohydrated lime.

5. The method of claim 1 wherein said aqueous liquid is dilute lime slurry.

6. The method of claim 5 wherein said lime is monohydrated lime.

7. The method of handling lime which comprises: transporting hydrated lime in dry, finely-divided form to a zone of utilization; continuously flowing by gravity the dry, finely-divided hydrated lime into a mixing zone; continuously injecting aqueous liquid, at a pressure between about 5 and about 30 pounds per square inch, into said mixing zone with the result and mixing of said lime and said aqueous liquid as a slurry in said mixing zone, the rates of flow of said lime and said aqueous liquid being such that there are between about 30 and about 50 parts, by weight, of lime per 100 parts, by weight, of slurry; and continuously withdrawing the slurry from said mixing zone through a zone of reduced pressure to storage at said zone of utilization.

8. The method of claim 7 wherein said lime is monohydrated lime, and wherein said aqueous liquid is water.

9. The method of claim 7 wherein said lime is monohydrated lime, and wherein said aqueous liquid is dilute lime slurry recycled from said storage.

References Cited in the file of this patent

UNITED STATES PATENTS

| | | |
|---|---|---|
| 632,829 | Berry | Sept. 12, 1899 |
| 1,486,883 | Halliburton | Mar. 18, 1924 |
| 1,775,265 | Allen | Sept. 9, 1930 |
| 2,631,899 | Jullien | Mar. 17, 1953 |
| 2,681,748 | Weller | June 22, 1954 |